US007111238B1

(12) United States Patent
Kuppusamy et al.

(10) Patent No.: US 7,111,238 B1
(45) Date of Patent: Sep. 19, 2006

(54) SYSTEM AND METHOD FOR MAINTAINING TEXT FORMATTING CONSISTENCY WITHIN AN ELECTRONIC DOCUMENT

(75) Inventors: Ashok Kuppusamy, Seattle, WA (US); Joe Keng Yap, Redmond, WA (US); James Noel Helfrich, Redmond, WA (US); Roberto C. Taboada, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 662 days.

(21) Appl. No.: 09/602,247

(22) Filed: Jun. 23, 2000

(51) Int. Cl.
*G06F 17/21* (2006.01)
*G06F 17/00* (2006.01)

(52) U.S. Cl. ..................... 715/542; 715/523
(58) Field of Classification Search ........ 715/530–533, 715/523, 540, 542, 500
See application file for complete search history.

(56) References Cited

U.S. PATENT DOCUMENTS

| 5,576,955 | A | * | 11/1996 | Newbold et al. ........... 715/533 |
| 5,621,875 | A | * | 4/1997 | Mason et al. ............... 715/531 |
| 5,832,530 | A | * | 11/1998 | Paknad et al. .............. 715/500 |
| 5,877,776 | A | * | 3/1999 | Beaman et al. ............ 345/472 |
| 6,088,711 | A | * | 7/2000 | Fein et al. .................. 715/523 |
| 6,092,092 | A | * | 7/2000 | Felt et al. ................... 715/530 |
| 6,125,377 | A | * | 9/2000 | Razin ......................... 715/531 |
| 6,393,442 | B1 | * | 5/2002 | Cromarty et al. .......... 715/523 |

* cited by examiner

*Primary Examiner*—Heather R. Herndon
*Assistant Examiner*—Paul H. Nguyen-Ba
(74) *Attorney, Agent, or Firm*—Merchant & Gould

(57) ABSTRACT

A Format Consistency Checker (FCC) for monitoring and enhancing text formatting within a document. The FCC builds and maintains a data table tracking all formatting "runs" within a document. The FCC operates in combination with a formatting pane, for adding formatting to a document. The formatting pane provides a log, maintained in a user interface that can be displayed in the same window as a document being edited, of all formatting in the document. A format checker determines a minority case of formatting within a particular document and offers a user an opportunity to modify the minority case formatting to make it consistent with the majority case. A bullets and numbering component determines how bullets and/or numbering have been previously applied in the document. The current format of the bullets and/or numbering is then set to be consistent with the majority case of bullets and/or numbering formatting in the document.

4 Claims, 7 Drawing Sheets

202 Now is the time for all good men *to come to the aid of their country*

203 Now is the time | for all good men | *to come to the aid* | *of their country*

204
not bold
not italics
no underline
Times New Roman
Point size = 20
Style : Normal 206
not bold
not italics
no underline
Times New Roman
Point size = 20
Style : Normal 208
bold
italics
no underline
Times New Roman
Point size = 20
Style : Normal 210
bold
italics
single underline
Times New Roman
Point size = 20
Style : Heading

*FIG. 2a*

SYSTEM AND METHOD FOR MAINTAINING TEXT FORMATTING CONSISTENCY WITHIN AN ELECTRONIC DOCUMENT

TECHNICAL FIELD

The present invention relates to a system and method for managing text formatting within an electronic document and more particularly relates to a system and method for monitoring and enhancing the consistency of text formatting within a document.

BACKGROUND OF THE INVENTION

Users of word processors and other document editors such as Microsoft Word commonly apply formatting to text within a document. Formatting provides a means for emphasizing text or differentiating one kind of text from another. Direct formatting is a conventional means for applying formats (e.g., bold face, italics, underlining) directly to text. Direct formatting involves a user selecting a portion of text within a document and then selecting a format to be applied to that text.

Another means for applying formatting to text is through the use of styles. A style is simply a set of formatting characteristics that can be applied to text and are grouped as a set. The style can be named, so that the set of formatting characteristics can be referred to with a single style name. For example, a "Header" style may include the following formatting characteristics: bold, font size 24, center justification, line spacing 2.0. Similarly, a style entitled "Body Text" may include formats such as not bold, not italics, point size=12, left and right justified, line spacing=1.0.

Unfortunately, for various reasons, many users find styles difficult to use. Moreover, even when users do utilize styles, it is typical that they will use styles inconsistently and will mix styles with direct formatting inconsistently. Because maintaining consistent formatting is essential in making documents look professional, there is a need in the art for a means for analyzing a document to determine the consistency of formatting whether by direct formatting or by the use of styles.

SUMMARY OF THE INVENTION

The present invention solves the problems of the prior art by providing a system and method for monitoring and enhancing the consistency of text formatting within a document. The present invention is comprised of four main components. The first component is the Format Consistency Checker (FCC). The FCC functions to build and maintain a data table that track all instances of formatting within a document in association with the location of each formatting instance within the document. The data table is referred to as a PLC and includes a list of "runs". Each run is the smallest chunk of text within the document having the same formatting properties. The PLC also maintains the location of that run within the document. In short, the FCC maintains a table of formatting instances within a particular document in association with the location of each instance. The FCC component operates in a pseudo-server capacity with the other three components of the invention operating in pseudo-client capacities. That is, the three components described below request and receive formatting information from the FCC.

The first of the client components is the Formatting Pane. The Formatting Pane is a tool by which a user can more easily add formatting to a document. The Formatting Pane provides a readily accessible log of all formatting in the document. The log is maintained in a user interface (UI) that can be displayed in the same window as a document being edited. The log is updated in real-time as a user formats the document. The log allows the user to perform various functions on existing formatting and to replace formatting with other formats to make a document formatting more consistent.

The Formatting Pane can be invoked by pressing a button on a toolbar in a document editor. The Formatting Pane will appear and provide a visual representation of the log of all formatting within the document. Clicking on an entry in the Formatting Pane will apply that formatting to selected text within the document. In addition, each entry in the Formatting Pane has a sub menu that can be invoked by the user. The sub-menu enables the user to perform various functions for a given format.

The first menu item within the sub-menu is "Select All". The Select All item will highlight all of the instances of the selected formatting within the document. This enables the user to modify the formatting of all highlighted instances with a single change to the Formatting Pane log entry. The sub-menu also includes a "New Style" item that permits the user to create a style with the set of formatting parameters identified by the Formatting Pane log entry. An "Update" item permits the user to make changes to the formatting set of a previously defined style. A "Modify" item allows the user to modify the instances of the selected Formatting Pane entry in the document and to create a new style including the set of formatting properties so modified. Finally, a "Delete" item permits the user to remove a style from a document and revert the instances previously associated with the deleted style to a "normal" style (i.e., some default style). The Delete item also permits the user to remove the Formatting Pane entry and any direct formatting associated with the entry.

Notably, all Formatting Pane entries can be associated with a style including paragraph styles, table styles, character styles, and list styles. Each Formatting Pane entry that is associated with a style is identified with an icon that identifies the category of style to which that formatting entry is associated.

The second component of the invention is the format checker component. The format checker component operates to determine a minority case of formatting within a particular document. For example, where the user has consistently used a particular kind of direct formatting throughout the document, the format checker component will locate one or more portions of a document with formatting that that is inconsistent with the majority of formatting instances within the document. The format checker component can offer the user an opportunity to modify the minority case formatting to make it consistent with the majority case formatting. The user will then be provided an opportunity to accept or ignore the suggestions of the format checker component. In an alternative embodiment, the format checker component can identify minority cases by some visual means such as a squiggled line under the minority case region of the document.

Finally, the third component is a bullets and numbering component (BNC). When the user selects to apply bullets and/or numbering in a document, the BNC utilizes the FCC to determine how bullets and/or numbering have been previously applied in the document. The current format of the bullets and/or numbering is then set to be consistent with the majority case of bullets and/or numbering formatting found in the document. If no majority case exists, then the default formatting can be applied, based on either the user's identified preferences or some default formatting defined by the application.

The various aspects of the present invention may be more clearly understood and appreciated from a review of the following detailed description of the disclosed embodiments and by reference to the drawings and claims.

BRIEF DESCRIPTION OF THE DRAWINGS

FIG. 2a is a textual representation of formatting runs within a document.

FIG. 4b is a graphical depiction of a submenu accessible within the context of the user interface of the Format Pane of FIG. 4a.

DETAILED DESCRIPTION OF EMBODIMENTS

Figure 1:
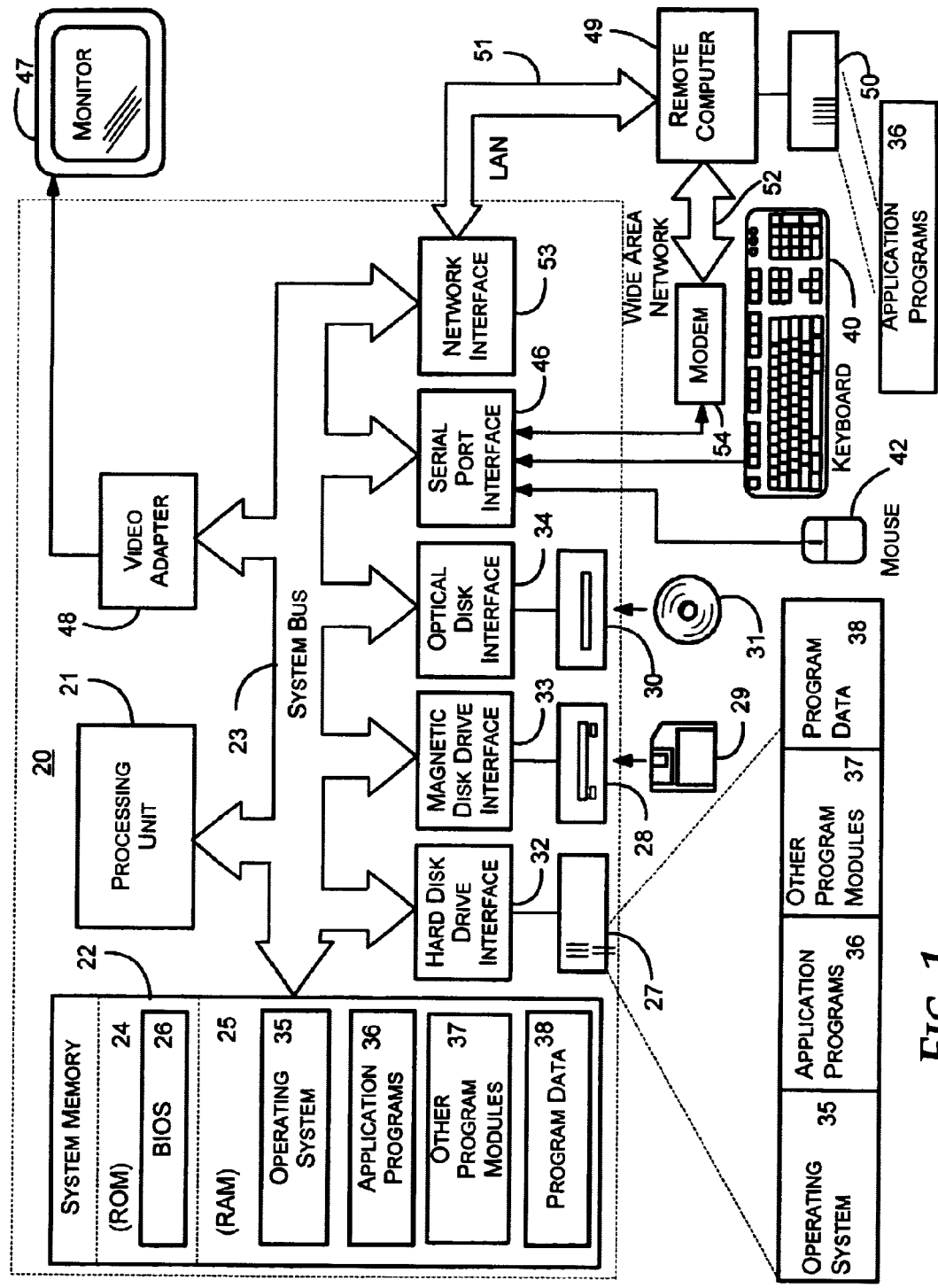
FIG. 1 is a block diagram of a computer system that provides the operating environment for an exemplary embodiment of the present invention.

The present invention solves the problems of the prior art by providing a system and method for monitoring and enhancing the consistency of text formatting within a document. The present invention is comprised of four main components. The first component is the Format Consistency Checker (FCC). The FCC functions to build and maintain a data table that tracks all instances of formatting within a document in association with the location of each formatting instance within the document. The data table is referred to as a PLC and includes a list of "runs". Each run is the smallest chunk of text within the document having the same formatting properties. The PLC also maintains the location of that run within the document. In short, the FCC maintains a table of formatting instances within a particular document in association with the location of each instance. The FCC component operates in a pseudo-server capacity with the other three components of the invention operating in pseudo-client capacities. That is, the three components described below request and receive formatting information from the FCC.

The first of the client components is the Formatting Pane. The Formatting Pane is a tool by which a user can more easily add formatting to a document. The Formatting Pane provides a readily accessible log of all formatting in the document. The log is maintained in a User Interface that can be displayed in the same window as a document being edited. The log is updated in real-time as a user formats the document. The log allows the user to perform various functions on existing formatting and to replace formatting with other formats to make a document formatting more consistent.

The Formatting Pane can be invoked by pressing a button on a toolbar in a document editor. The Formatting Pane will appear and provide a visual representation of the log of all formatting within the document. Clicking on an entry in the Formatting Pane will apply that formatting to selected text within the document. In addition, each entry in the Formatting Pane has a sub menu that can be invoked by the user. The sub-menu enables the user to perform various functions for a given format.

The first menu item within the sub-menu is "Select All". The Select All item will highlight all of the instances of the selected formatting within the document. This enables the user to modify the formatting of all highlighted instances with a single change to the Formatting Pane log entry. The sub-menu also includes a "New Style" item that permits the user to create a style with the set of formatting perimeters identified by the Formatting Pane log entry. An "Update" item permits the user to make changes to the formatting set of a previously defined style. A "Modify" item allows the user to modify the instances of the selected Formatting Pane entry in the document and to create a new style including the set of formatting properties so modified. Finally, a "Delete" item permits the user to remove a style from a document and revert the instances previously associated with the deleted style to a "normal" style (i.e., some default style). The Delete item also permits the user to remove the Formatting Pane entry and any direct formatting associated with the entry.

Notably, all Formatting Pane entries can be associated with a style including paragraph styles, table styles, character styles, and list styles. Each Formatting Pane entry that is associated with a style is identified with an icon that identifies the category of style to which that formatting entry is associated.

The second component of the invention is the format checker component. The format checker component operates to determine a minority case of formatting within a particular document. For example, where the user has consistently used a particular kind of direct formatting throughout the document, format checker component will locate one or more portions of a document with formatting that that is inconsistent with the majority of formatting instances within the document. The format checker component can offer the user an opportunity to modify the minority case formatting to make it consistent with the majority case. The user will then be provided an opportunity to accept or ignore the suggestions of the format checker component. In an alternative embodiment the format checker component can identify minority cases by some visual means such as a squiggled line under the minority case region of the document.

Finally, the third component is a bullets and numbering components (BNC). When the user selects to apply bullets and/or numbering in a document, the BNC utilizes the FCC to determine how bullets and/or numbering have been previously applied in the document. The current format of the bullets and/or numbering is then set to be consistent with the majority case of bullets and/or numbering formatting found in the document. If no majority case exists, then the default formatting can be applied, based on either the user's identified preferences or some default formatting defined by the application.

The various aspects of the present invention may be more clearly understood and appreciated from a review of the following detailed description of the disclosed embodiments and by reference to the drawings and claims.

An Exemplary Operating Environment

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more document editors 36, an Format Consistency Checker 38, and one or more format consistency components, such as Format Pane 39 which could be incorporated within document editor 36 or Format Consistency Checker 38 for maintaining or monitoring various aspects of the formatting consistency of text in a document. It will be appreciated that Format Consistency Checker 38 and Format Pane 39 could be integrated into document editor 36. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The memory storage device 50 may include stored program modules that are executable by the remote computer 49. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

An exemplary embodiment of the present invention is represented by document editors including the "MICROSOFT WORD" word processing application program, the "MICROSOFT EXCEL" spreadsheet application program, the "MICROSOFT ACCESS" database application program, and the "MICROSOFT POWERPOINT" graphical presentation application program. However, it should be understood that the present invention can be implemented by various program modules and/or application programs for use with various operating systems.

An Exemplary Document

FIG. 2a depicts an exemplary document 200 which includes formatted text. Line 202 of document 200 includes a group of text having various formatting properties. A "run" is the smallest section of text in a document sharing a particular attribute. In the case of formatting attributes, a run is a smallest section of text that shares identical formatting attributes. Runs are also referred to as "instances". Line 203 of document 200 includes four runs 204, 206, 208, and 210 sharing identical formatting properties. The runs of line 202 are separated at line 203. Runs 204, 206, 208, and 210 have formatting attributes that are unique from one another. However, for all of the text within a given run, the formatting attributes are consistent. The formatting attributes associated with each of runs in line 203 are depicted under their respective runs in FIG. 2a.

Runs 204, 206, and 208 have formatting attributes associated with the default or "Normal" style. Run 210, on the other hand, has the formatting attributes of the defined "Heading" style. The use of styles as a formatting tool is well known in the art. Moreover, the association of style names with a set of formatting attributes is also well-known in the art. The relevance of styles and direct formatting in the context of the present invention will be discussed in more detail below.

Figure 2B:
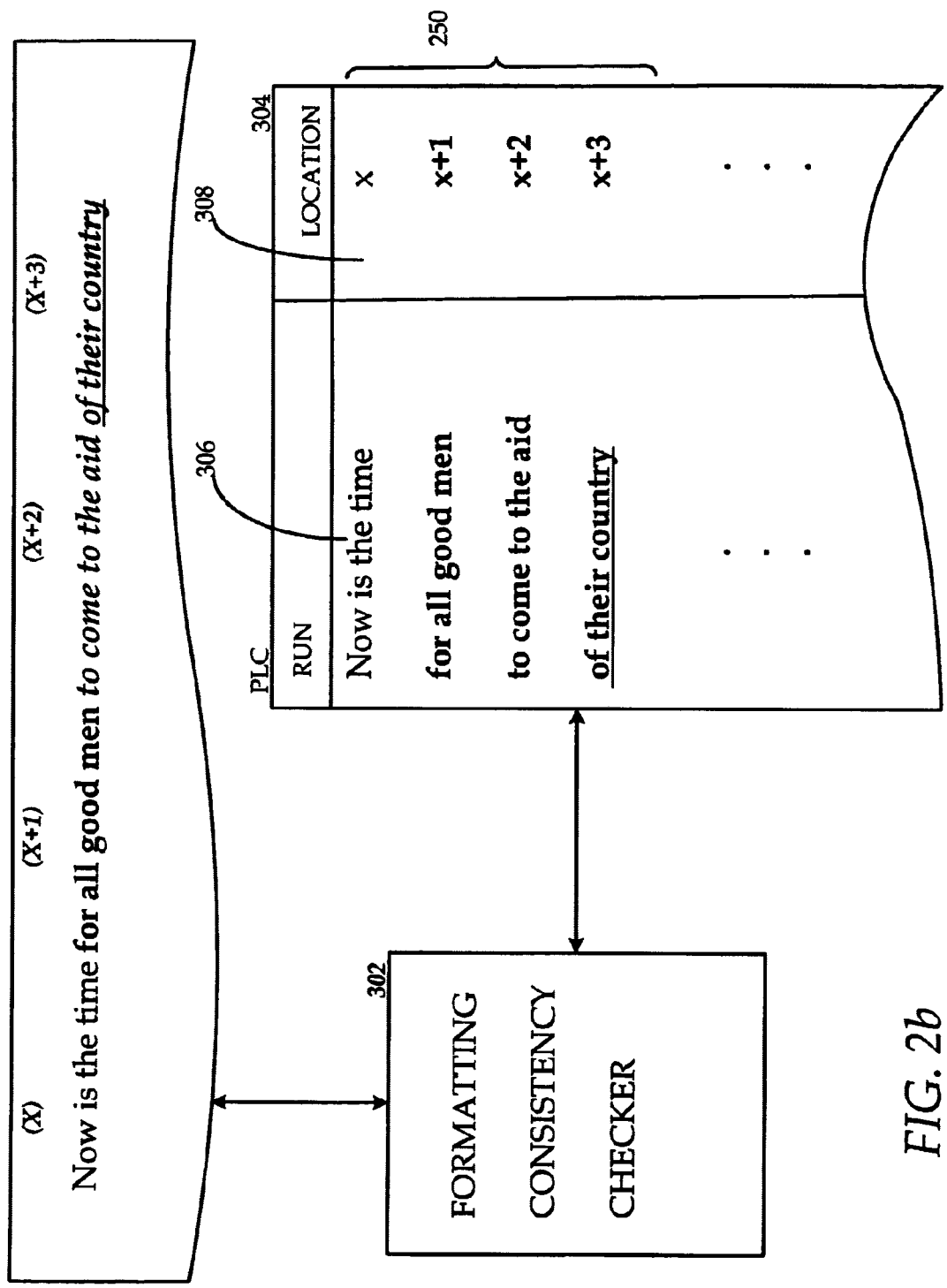
FIG. 2b is a block diagram depicting the primary components of an exemplary Formatting Consistency Checker for maintaining and tracking formatting runs within an electronic document.

FIG. 2b depicts text within document 301. The text is separated into runs, as described in connection with FIG. 2a. However, the runs have been associated with a location within the document 301. It is well known in the art that text within a document can be identified by referring to a location within the document.

FIG. 2b further depicts a formatting consistency checker (FCC) 302 which can be used to analyze a document in the background to associate runs with document locations. The FCC 302 functions to build and maintain a data table that can be used to track all instances of formatting runs within a document in association with the location of each formatting run. The data table is referred to as a PLC 304 and includes a list of runs 306. As stated above, each run is defined as the smallest chunk of text within the document having the same formatting properties. The PLC 304 also maintains a location list 308 which associates a document location with each run in the document 301.

The FCC 302, therefore, maintains a table of formatting runs within a particular document in association with the location of each of the formatting runs. By analyzing the document 301 in the background, the FCC 302 updates the PLC 304 to maintain a current list of formatting runs and their associated locations. As will be described in more detail in connection with FIGS. 3–6, the FCC 302 operates in a pseudo-server capacity with three other components of the present invention which operate in pseudo-client capacities. The pseudo-client components utilize the information in the PLC 304 through the FCC 302.

Figure 3:
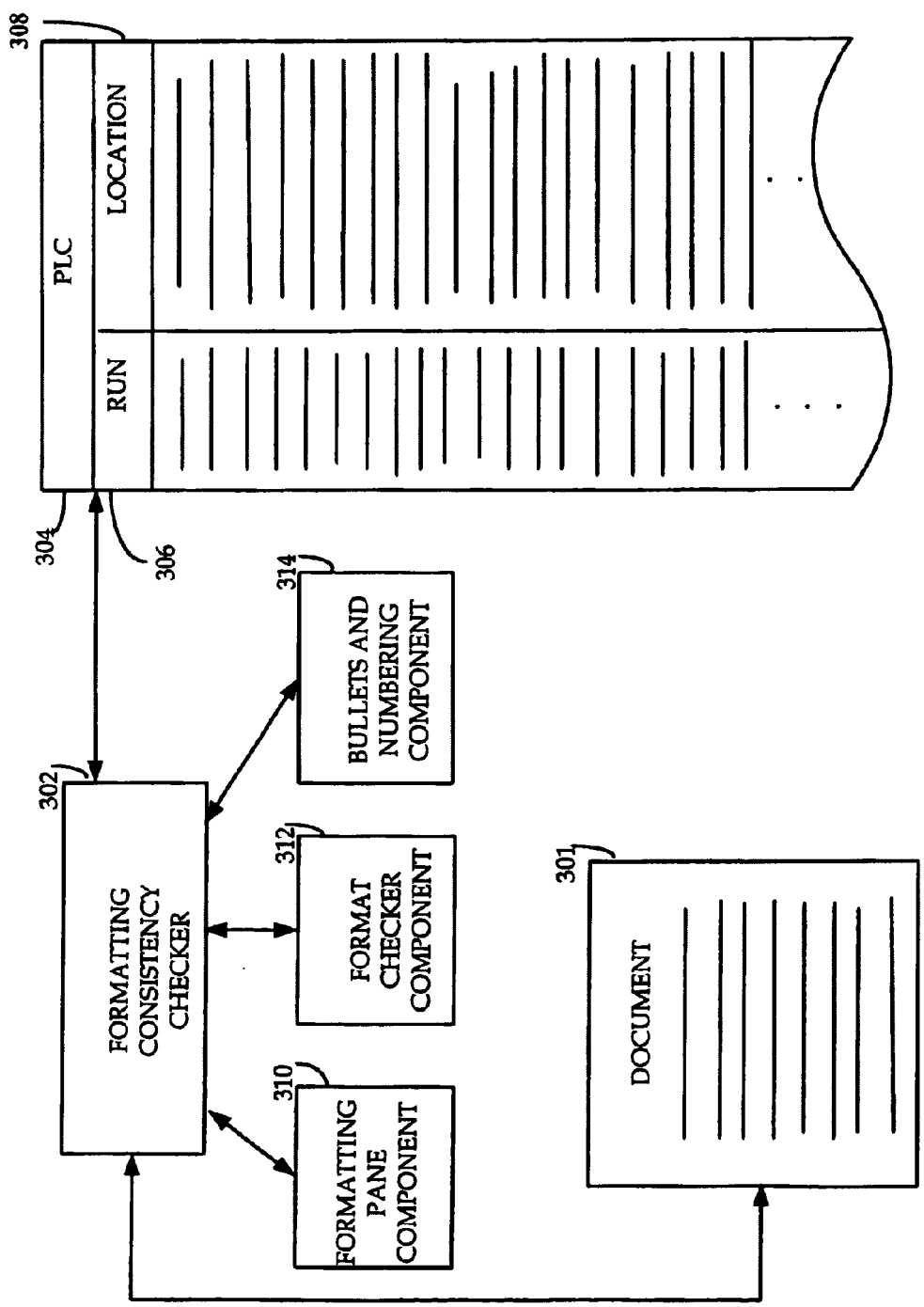
FIG. 3 is a block diagram depicting the interaction between the Formatting Consistency Checker and the other primary consistency components of an exemplary embodiment of the present invention.

Turning now to FIG. 3, the primary components of an exemplary embodiment of the present invention are depicted in block diagram format. The FCC 302 operates in a pseudo-server capacity with respect to the three sub-components of the present invention. The sub-components include a formatting pane 310, a format checker 312, and a bullets and numbering component 314. As discussed above in connection with FIG. 2b, the sub-components are able to access the run 306 and location data 308 within the PLC 304 by interaction with the FCC 302.

Specifically, the sub-components 310, 312, and 314 each send a "call back" request to the FCC 302 identifying the information that the sub-component seeks from the FCC 302. In essence, the call back acts as a information filter to limit the information that is transmitted from the FCC 302 to any given sub-component. The call back request is a well known means for managing information flow between program modules.

An Exemplary Formatting Pane

Figure 4A:
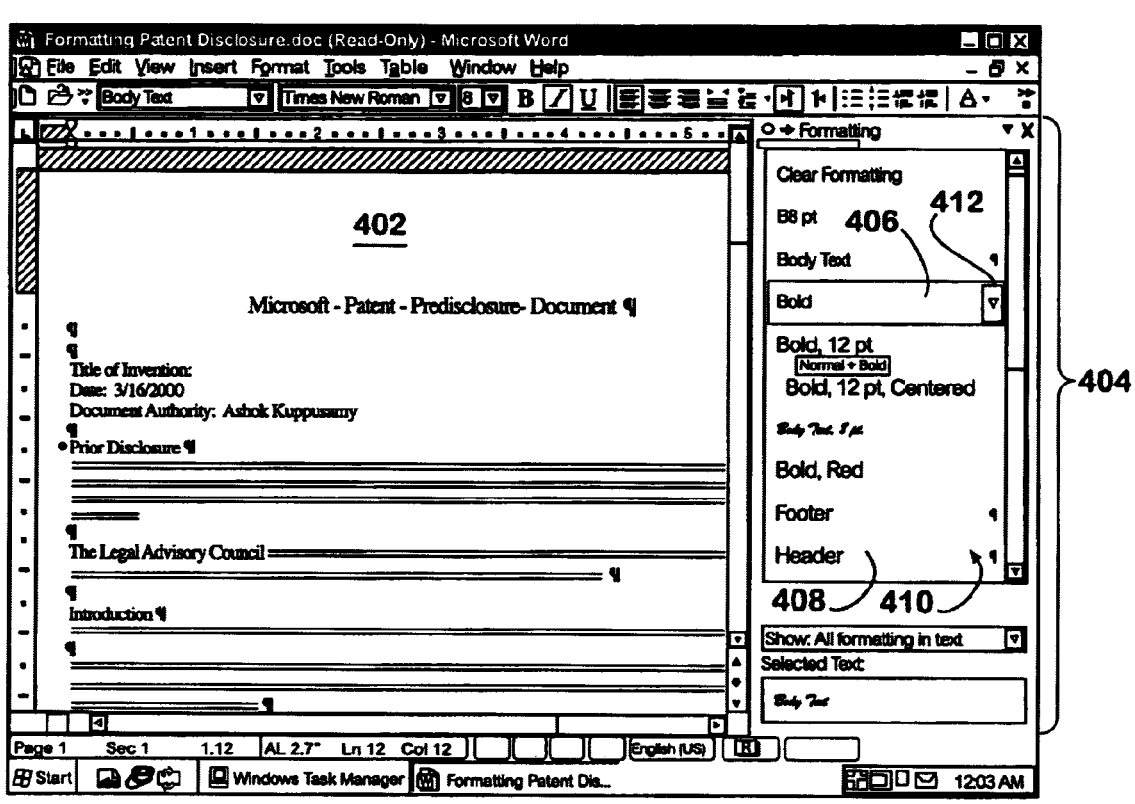
FIG. 4a is a graphical depiction of the user interface of the Format Pane of an exemplary embodiment of the present invention.

The first of the pseudo-client components is the formatting pane which is depicted in FIG. 4a. The formatting pane is a tool by which a user can more easily add formatting to a document. FIG. 4a depicts a screen shot of a typical document editor 400, such as Microsoft Word. The document 402 is displayed within a pane of the document editor 400 in a conventional manner. In an exemplary embodiment of the present invention, a formatting pane 404 is implemented within the user interface of document editor 400. The formatting pane 404 provides a readily accessible log of all formatting in the document 402. The log is maintained in the formatting pane 404. The log is updated in real-time as a user formats a document. The formatting pane 404 can be invoked by pressing a button on a toolbar within the user interface of the document editor 400. When invoked, the formatting pane appears and provides a visual representation of the log of all formatting within the document. Clicking on an entry in the formatting pane will apply that formatting to any selected text within the document.

As stated above, the log is updated and real-time. This real time updating is performed by virtue of the interaction between the formatting pane component 310 and the formatting consistency checker 302, depicted in FIG. 3. As described above, the FCC 302 continuously analyzes the document 301 in the background and updates PLC 304. Because the formatting pane component 310 maintains a call back request with the FCC 302, the updated information is made available to formatting pane component 310.

Returning now to FIG. 4a, the entries within the formatting pane 404 can be highlighted by the user. When highlighted, the entry will also highlight the text within the document that has the formatting properties identified by the formatting pane entry. For example, entry 406 has been highlighted and identifies the formatting property of "bold" when formatting pane entry 406 is highlighted, all runs within document 402 will be highlighted that have the set of formatting properties identical to that of formatting pane entry 406. In this example, all bold text not having other formatting properties will be highlighted within document 402.

If a run within the document 402 is the only instance of a particular set of formatting properties, that set of formatting properties will be represented in the formatting pane 410. However, if that run is deleted, and no other runs exist in document 402 having the same formatting properties, the formatting pane entry corresponding to the deleted run will be removed from the formatting pane log.

In the event that a formatting pane entry exists that includes an identical set of formatting properties as a defined style, the formatting pane entry may be automatically changed to reflect the style name. This style name would be listed in the formatting pane 404 instead of the list of formatting properties associated with the formatting pane entry. For example, formatting pane entry 408 is associated with the (header style). Additionally, each formatting pane can be identified as a paragraph style, table style, character style, or list style. These types of styles are well known in the art and are used to define sets of formatting properties that can be associated with paragraphs, tables, characters, and lists, respectively. Each formatting pane entry that is associated with a style category is identified as such with an icon 410 that identifies the style category to which that formatting entry is associated.

Each formatting pane entry has an associated sub-menu. The sub-menu is accessed by button 412.

Figure 4B:
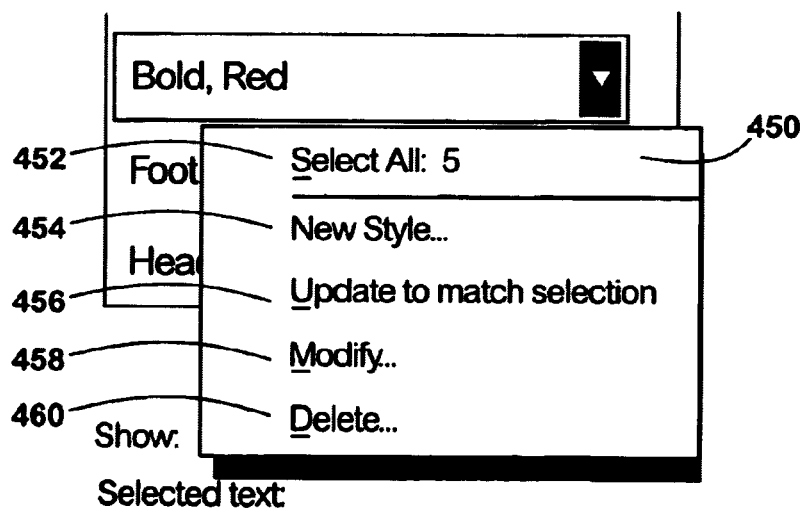

Turning now to FIG. 4b, an exemplary submenu 450 is depicted. The submenu contains menu items 452–460. The first menu item within the submenu 450 is the "select all" menu item 452. The selected all menu item 452 will highlight all of the runs in the document 402 that have a formatting properties set identical to the formatting pane entry to which the submenu 450 is associated. This enables the user to modify the formatting of all highlighted runs with a single change to the formatting pane entry.

The submenu 450 also includes a "new style" menu item 454 that permits the user to create a new style. The new style that is created will have the set of formatting perimeters identified by the formatting pane entry to which the submenu 450 is associated.

The submenu 450 includes an "update" menu item 456 that enables the user to make changes to the formatting set of a previously defined style. A "modified" menu item 458 enables the user to modify the runs of the selected formatting pane entry and to create a new style having the set of formatting properties so modified.

A "delete" menu item 460 enables the user to remove a style from a document and to revert the runs previously associated with the deleted style to a "normal" style (i.e. sum default style). The delete menu item 460 also permits the user to remove the formatting pane entry and any direct formatting associated with the entry that has been applied to one or more runs within the document.

An Exemplary Format Checker Component

In an exemplary embodiment of the present invention, a format checker component is provided to enhance formatting consistency within a particular document. For example, where a user has consistently used a particular kind of direct formatting throughout the document, the Format Checker Component 312 will locate one or more portions of the document having formatting that is inconsistent with the majority of formatting runs in the document. The Format Check Component 312 can provide the user with an opportunity to modify the identified minority case of formatting in order to make the minority case consistent with the majority case. The user can then be provided with an opportunity to accept or ignore the suggestions of the Format Checker Component 312. In an alternative embodiment of the present invention, the Format Checker Component 312 can visually identify minority cases to the user. For example, the Format Checker Component 312 could highlight the text that includes formatting that is inconsistent with the majority case previously identified.

In an exemplary embodiment of the present invention, inconsistencies are determined by comparing one or more runs within the document to a set of consistency rules. For example, a rule may define an inconsistency as a variation of font sizes greater than one point. Thus, consistency rules can be used to focus the Format Checker Component 312 on meaningful inconsistencies. Less meaningful inconsistencies, such as slight variations in point size, can be ignored by the use of the consistency rules set.

Figure 5:
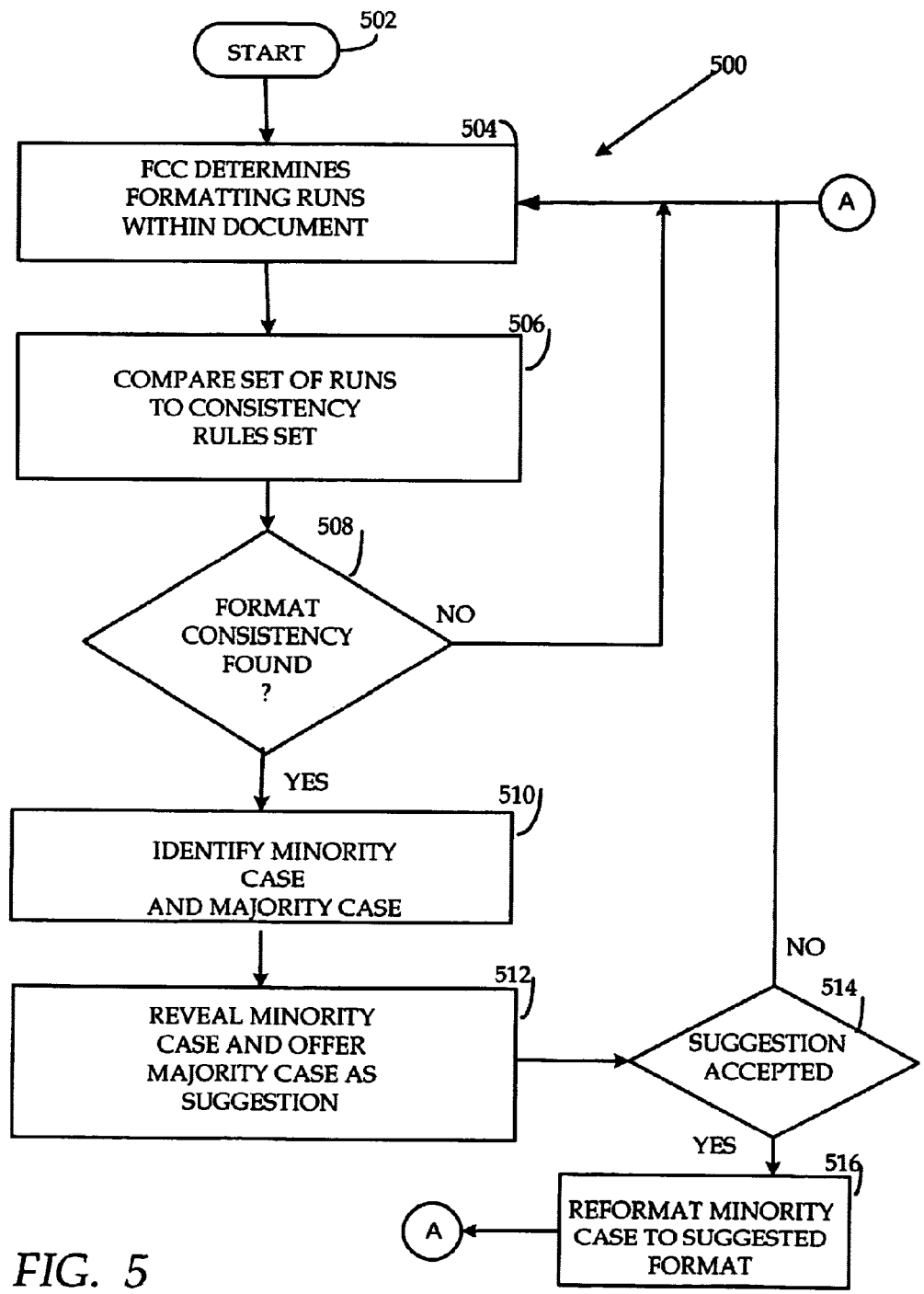
FIG. 5 is a method for checking the text formatting consistency of a document in an exemplary embodiment of the present invention.

Turning now to FIG. 5, a flow chart 500 depicts a method for checking the consistency of formatting runs within a document of an exemplary embodiment of the present invention. The method starts at step 502 and proceeds to step 504. At step 504, the FCC 302 determines the formatting runs that exist in the document, as described in more detail in connection with FIGS. 2b and 3. The method then proceeds to step 506 and the runs identified by the FCC 302 are compared to consistency rules to determine whether any meaningful inconsistencies exist. The method proceeds to decision block 508 at which a determination is made as to whether any format and consistencies were found by the comparison of step 506. If no inconsistencies are found, the method branches to step 504 and the FCC 302 continues analyzing the document in the background.

Returning to decision block 508, if an inconsistency is found, the method branches to step 510 and the minority cases and majority cases are identified. A majority case is a set of formatting properties that is associated with the most runs in the document having an analogous formatting property. The minority case represents the runs within document that are inconsistent with the majority case as the inconsistency is defined by the consistency rules. For example, if a document is primarily comprised of runs having a point size of 12, a small number of runs having a point size of 5 may be identified by the Format Checker Component 302 as a minority case.

Returning now to FIG. 5, the method proceeds from step 510 to step 512 and the minority cases are revealed to the user as described above. At step 512, the user can also be offered a suggestion that may include the minority case. The method then proceeds to decision block 514 wherein a decision is made as to whether the suggestion was accepted by the user. If the suggestion is not accepted by the user, then the method branches to step 504, as described above. If the suggestion is accepted by the user, the method branches to step 516 and the minority case is reformatted to the suggested format. The method then proceeds to step 504, through connector A.

An Exemplary Bullets and Numbering Checking Component

Figure 6:
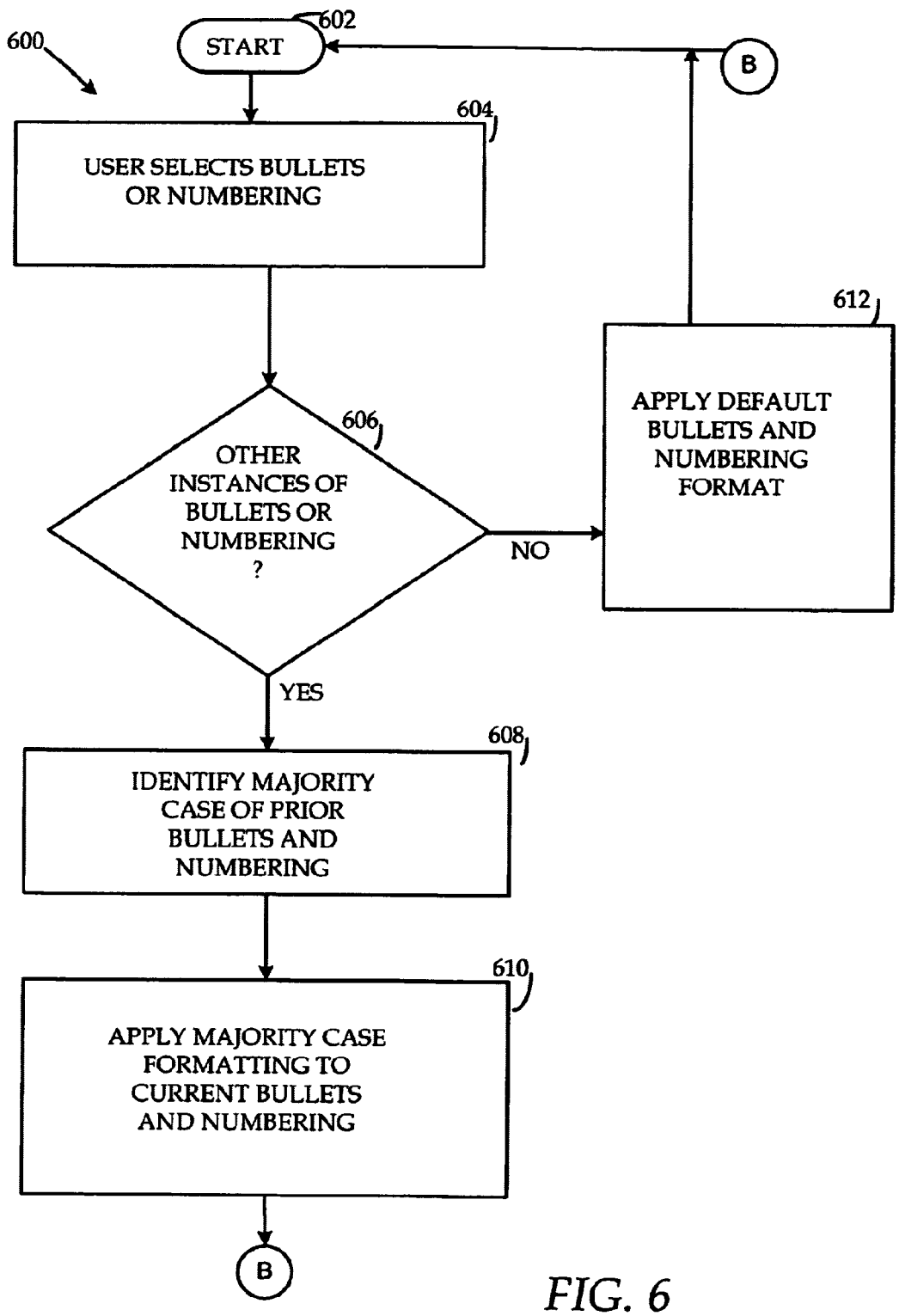
FIG. 6 is a method for checking the bullets and numbering formatting consistency of a document in an exemplary embodiment of the present invention.

The third component of an exemplary embodiment of the present invention is a bullet and numbering component (BNC). The bullet and numbering component is operative to increase consistency among bullets and/or numbering in a document. When a user selects to apply bullets and/or numbering in a document, the bullet and numbering component utilizes the information provided by the FCC 302 to determine how bullets and/or numbering have been previously applied in the document. The current format of the bullets and/or numbering is inset to be consistent with the majority case of bullets and/or numbering formatting found in the document. If no majority case exists, then the default formatting can be applied. The default formatting for bullets and/or numbering may be based either on the users identified preferences or on some default formatting defined by the document editor. Turning now to FIG. 6, a method for increasing bullets and/or numbering consistency is depicted. The method starts at step 602 and proceeds to step 604. At step 604, the user selects add bullets or numbering to the document. The method then proceeds to decision block 606 in which a determination is made as to whether other instances of bullets or numbering exist in the document. If no other instances exist, then the method branches to step 612 and the default bullets and/or numbering format is applied. The method then proceeds to step 602 and starts over.

If, on the other hand, other instances of bullets and/or numbering exist within the document, the method branches from decision block 606 to step 608. At step 608, the majority case of existing bullets and/or numbering formatting is identified. The method then proceeds to step 610 and the majority case formatting is applied to the current bullets and/or numbering format. The method then proceeds to step 602, via connector B.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

We claim:

1. A method for improving formatting consistency within a document, implemented at least in part by a computing device, comprising:

determining a formatting run within a document, wherein the formatting run is the smallest section of text within the document having the same formatting attributes;

comparing the formatting run to a consistency rule set;
determining whether an inconsistency of the formatting run exists relative to the consistency rule set;
in response to determining that an inconsistency exists, identifying a majority case and a minority case of inconsistencies, wherein:
   a majority case is a set of formatting properties that is associated with the most formatting runs in the document having an analogous formatting property, And
   a minority case is a set of formatting properties that is inconsistent with the majority case as the inconsistency is defined by the consistency rule set; and
revealing the minority case and the majority case to a user.

2. The method of claim 1 further comprising:
in response to revealing a minority case to a user, offering a suggested case format to the user.

3. The method of claim 2, further comprising the steps of:
determining whether the suggested case format is accepted by the user; and
in response to determining that the suggested case format is accepted, reformatting the minority case to the suggested case format.

4. The method of claim 2, wherein the suggested case format is the majority case.

* * * * *